United States Patent
Han et al.

(10) Patent No.: US 7,948,455 B2
(45) Date of Patent: May 24, 2011

(54) APPARATUS AND METHOD FOR REGULATING WHITE LEDS

(75) Inventors: Mingkwang Han, Singapore (SG); Footshen Wong, Singapore (SG); Vlad Popescu-Stanesti, San Jose, CA (US); Winson Wong, Singapore (SG); Jacky Lin, Yi-Lan Shien (TW)

(73) Assignee: O2Micro Inc., Santa Clara, CA (US)

( * ) Notice: Subject to any disclaimer, the term of this patent is extended or adjusted under 35 U.S.C. 154(b) by 1006 days.

(21) Appl. No.: 11/254,467

(22) Filed: Oct. 20, 2005

(65) Prior Publication Data

US 2007/0091036 A1    Apr. 26, 2007

(51) Int. Cl.
    *G09G 3/32* (2006.01)
(52) U.S. Cl. ......................................................... 345/82
(58) Field of Classification Search ............... 345/76, 345/82, 98; 327/538
    See application file for complete search history.

(56) References Cited

U.S. PATENT DOCUMENTS

| | | | |
|---|---|---|---|
| 6,747,617 B1 * | 6/2004 | Kawashima | 345/76 |
| 7,116,086 B2 * | 10/2006 | Burgyan et al. | 323/271 |
| 7,436,378 B2 * | 10/2008 | Ito et al. | 345/82 |
| 2002/0105373 A1 | 8/2002 | Sudo | |
| 2004/0080471 A1 | 4/2004 | Kim | |
| 2004/0155840 A1 * | 8/2004 | Abe et al. | 345/76 |
| 2004/0233144 A1 * | 11/2004 | Rader et al. | 345/82 |
| 2005/0007089 A1 | 1/2005 | Niiyama | |

* cited by examiner

*Primary Examiner* — Chanh Nguyen
*Assistant Examiner* — Ram A Mistry
(74) *Attorney, Agent, or Firm* — Wang Law Firm, Inc.; Li K. Wang

(57) ABSTRACT

The present invention is an apparatus for driving white LEDs. The apparatus includes a switchable current sink, a DC-DC converter and a reference circuit. The DC-DC converter provides a driving voltage to a plurality of LEDs. The switchable current sink regulates currents through the plurality of LEDs, and the switchable current sink further provides a first reference voltage and outputs a plurality of voltage drops. The reference circuit receives the first reference voltage and the plurality of voltage drops to provide a second reference voltage to the DC-DC converter. The DC-DC converter adjusts the driving voltage provided to the plurality of LEDs according to the second reference voltage. In this way, the driving voltage is regulated to a minimum possible value and consequently the voltage drops across the switchable current sink is minimized. Hence, the LED driving system maintains higher efficiency.

17 Claims, 15 Drawing Sheets

STATES OF SWITCHES DURING TON AND TOFF

| MODE OF CONVERTER | CYCLE | SW1 | SW2 | SW3 | SW4 |
|---|---|---|---|---|---|
| BOOST | TON | ON | OFF | ON | OFF |
|  | TOFF | ON | OFF | OFF | ON |
| BUCK-BOOST | TON | ON | OFF | ON | OFF |
|  | TOFF | OFF | ON | OFF | ON |
| BUCK | TON | ON | OFF | OFF | ON |
|  | TOFF | OFF | ON | OFF | ON |

FIG. 3

| MODE OF CONVERTER | CYCLE | EQUATION $V_{fb} \approx V_{ref}$ | EQUATION $V_{fb} < V_{ref}$ |
|---|---|---|---|
| BUCK | TON | K/(Vin - Vref*D) | K/(Vin - Vref*D) |
| | TOFF | K/(Vref*D) | K/(Vref*D - Ka(Vfb - Vref)) |
| BUCK-BOOST | TON | K/Vin | K/Vin |
| | TOFF | K/Vref*D | K/(Vref*D - Ka(Vfb - Vref)) |
| BOOST | TON | K/Vin | K/Vin |
| | TOFF | K /(Vref*D - Vin) | K/((Vref*D - Vin) - Ka(Vfb - Vref)) |

D=Vout/Vfb

FIG. 4

APPARATUS AND METHOD FOR REGULATING WHITE LEDS

FIELD OF THE INVENTION

The present invention relates to light emitting diode (LED), and more particularly to control of LEDs.

BACKGROUND OF THE INVENTION

With the migration from monochrome displays toward higher resolution color displays, a white backlight to properly display colors has been required. There are two main methods for providing a white light source: white LEDs and cold-cathode fluorescent lamps (CCFLs). CCFLs have been used for years in notebook computers. However, because of their size, complexity, and cost advantages, white LEDs are becoming the preferred light source for small handheld devices.

White LEDs can be powered in parallel or in series. A weakness of the parallel method is that white LED current and brightness do not necessarily match. For the parallel connected white LEDs, forward voltage variance of these white LEDs can be greater than 100 mV. This can lead to poor current and brightness matching in parallel configurations where currents across the white LEDs are not regulated. Generally, a current source is used to regulate the current through a white LED. Another problem is that the white LEDs have a high voltage drop, 3.1V to 3.4V depending on manufacturers, compared to red and green LEDs with a typical voltage drop of 1.8V to 2.7V. Whereas the red and green LEDs can be powered directly from a common battery, the white LEDs require the battery voltage to be regulated. Usually, a DC-DC converter is used to regulate the driving voltage of the white LEDs.

With regard to the efficiency, power loss in white LED drivers typically occurs in power consumed by DC-DC converters and power consumed by white LED current sources. Typically, the power loss from the white LED current source dictates the white LED driver efficiency. It is the goal of both applications and integrated circuit (IC) design to find ways to minimize the power loss in the white LED current source by reducing the voltage drop across the current source. In conventional designs, the voltage drop is kept constant for all possible load conditions, which will lead to a considerable variation in efficiency under different load conditions. Furthermore, each white LED is usually provided with an exclusive current source. When the number of white LEDs is large, the current sources will occupy a considerable area. This will undermine the pursuit for a small die area during the design.

Accordingly, it is to such an apparatus and method that can provide a high efficiency and at the same time reduce the die area the present invention is primarily directed.

SUMMARY OF THE INVENTION

In one embodiment, there is provided a device for adjusting a driving voltage provided to a plurality of light emitting diodes (LEDs). The device includes a switchable current sink coupled to cathodes of the plurality of LEDs for providing a regulated current to the plurality of LEDs, a DC-DC converter coupled to anodes of the plurality of LEDs for providing the driving voltage to the plurality of LEDs, and a reference circuit coupled to the switchable current sink. The switchable current sink is capable of providing a first reference voltage and outputting a plurality of voltage drops. The reference circuit is capable of receiving the first reference voltage and the plurality of voltage drops from the switchable current sink. The reference circuit is further capable of generating a second reference voltage for the DC-DC converter, The DC-DC converter adjusts the driving voltage provided to the plurality of LEDs according to the second reference voltage.

In another embodiment, there is provided a switchable current sink for providing a plurality of regulated currents through a plurality of circuitries. The switchable current sink includes a current control circuit capable of outputting a reference signal for controlling the plurality of regulated currents, a selector signal generator for generating a plurality of selector signals, and a connection circuit having a reference input terminal, a plurality of current terminals, and a plurality of selector terminals. The reference input terminal receives the reference signal from the current control circuit, each current terminal being coupled to one of the plurality of circuitries, each selector terminal being coupled to one of the plurality of selector signals. The connection circuit provides a regulated current to each circuitry according to the plurality of selector signals, the regulated current being regulated through the reference signal.

In yet another embodiment, there is provided a DC-DC converter for converting a DC input voltage to a DC output voltage, wherein the DC output voltage is adjustable. The DC-DC converter includes a converting unit and a controller coupled to the converting unit. The converting unit has a voltage input terminal, a voltage output terminal and a plurality of control terminals. The voltage input terminal receives the DC input voltage, and the voltage output terminal outputs the DC output voltage. The controller is capable of providing a plurality of control signals to the plurality of control terminals. The plurality of control signals have a switching sequence and a switching cycle. The converting unit adjusts the DC output voltage according to the switching sequence and switching cycle of the plurality of control signals.

In yet another embodiment, there is provided a method of adjusting a driving voltage provided to a plurality of light emitting diodes (LEDs). The method includes the steps of generating at a DC-DC converter the driving voltage, providing through a current sink a plurality of regulated currents to the plurality of LEDs and a first reference voltage, comparing at an error amplifier the first reference voltage with a voltage drop across the current sink, generating at the error amplifier a second reference voltage according to a comparison result from comparing the first reference voltage with the voltage drop, and adjusting at the DC-DC converter the driving voltage to a minimum possible value according to the second reference voltage.

In yet another embodiment, there is provided a method of generating a regulated current through a plurality of current sinking paths of a current sink. The method includes the steps of receiving at least one current control signal, generating a reference voltage based on the at least one current control signal, generating a plurality of selector signals, selecting a select current sinking path from the plurality of current sinking paths according to the plurality of selector signals, applying the reference voltage to the select current sinking path, and generating the regulated current through the select current sink path.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 3 is a table illustrating states of the four switches in FIG. 2A;

FIG. 4 is a table illustrating equations used for calculating switching cycles for the four control signals in FIG. 2A;

DETAILED DESCRIPTION OF THE INVENTION

Reference will now be made in detail to the preferred embodiments of the present invention. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skilled in the art that the present invention may be practiced without these specific details. In other instances, well known methods, procedures, components, and circuits have not been described in detail as not to unnecessarily obscure inventive aspects of the present invention.

Figure 1:
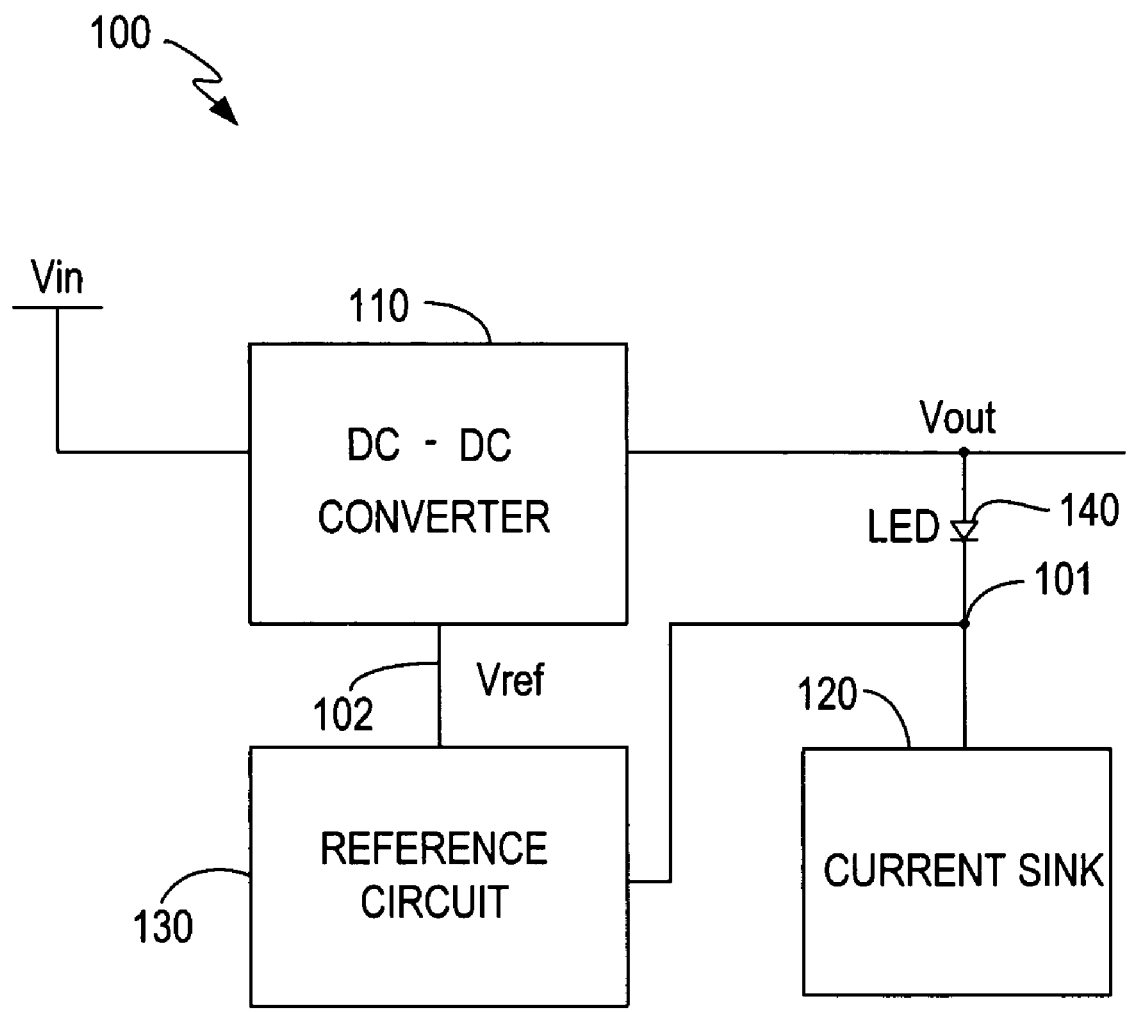
FIG. 1 is a simplified block diagram illustrating one exemplary embodiment.

FIG. 1 is a simplified block diagram illustrating an embodiment 100. The embodiment 100 includes a DC-DC converter 110, a current sink 120, a reference circuit 130, and a load, for example, a white LED 140. The DC-DC converter 110 receives a DC input voltage Vin and converts it to a DC output voltage Vout. The DC output voltage Vout is used to drive the white LED 140. The current sink 120 is used to regulate the current flowing through the white LED 140. By detecting the voltage at node 101, the reference circuit 130 provides a reference voltage Vref to the DC-DC converter 110 through path 102. According to the reference voltage Vref, the DC-DC converter 110 will adjust Vout to a desired voltage level, which can be above, below or equal to the DC input voltage Vin. The desired DC output voltage Vout is just enough to drive the white LED 140 and at the same time maintain a minimum possible voltage at node 101. The minimum possible voltage at node 101 must ensure the proper function of the current sink 120.

Figure 2A:
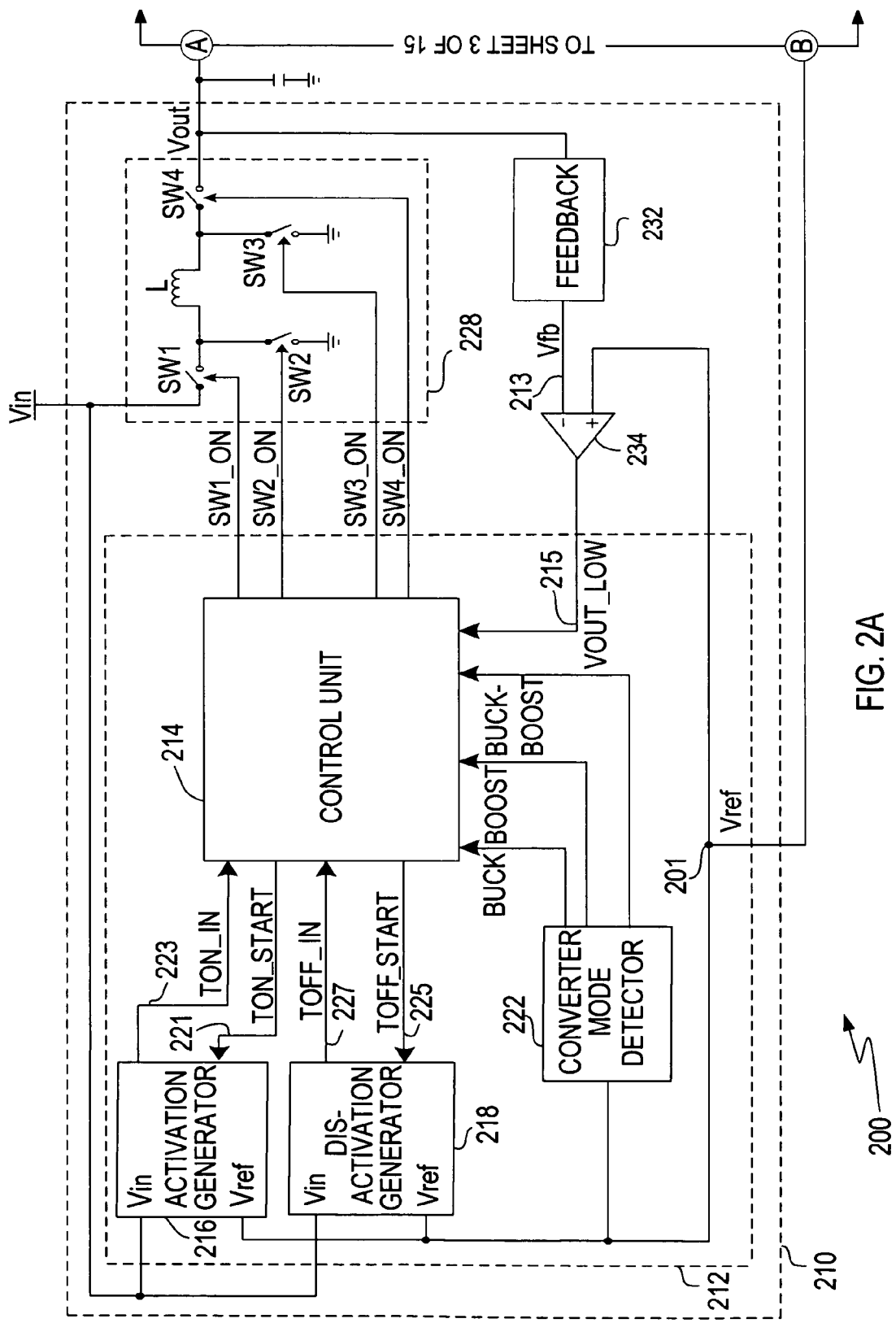
FIG. 2A and FIG. 2B illustrate in detail a block diagram of another exemplary embodiment.
Figure 2B:
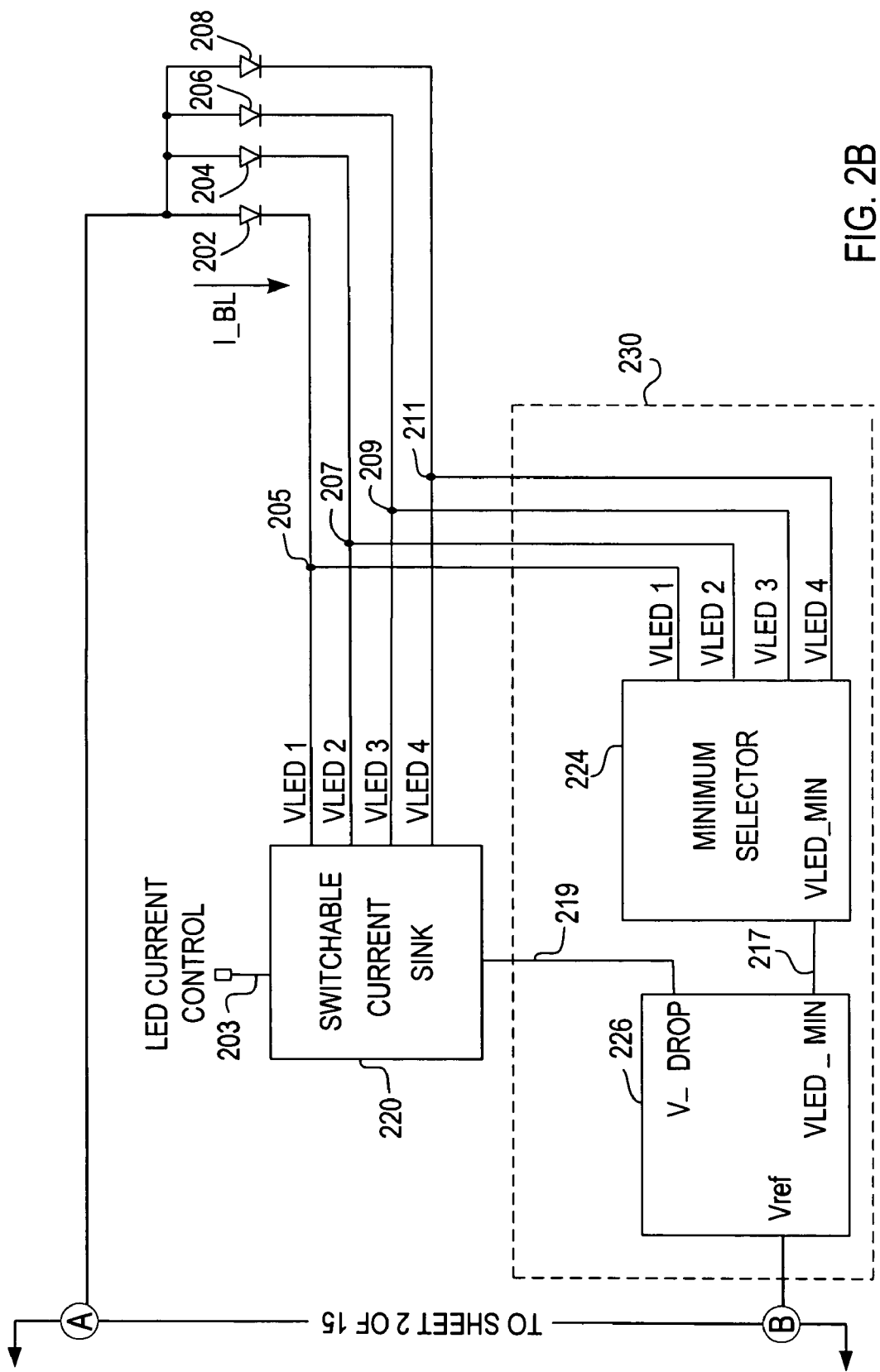

FIG. 2A and FIG. 2B illustrate a block diagram of an embodiment 200. The embodiment 200 includes a DC-DC converter 210, a switchable current sink 220, a reference circuit 230 and a load, for example, four white LEDs 202, 204, 206 and 208 coupled in parallel. The DC-DC converter 210 is coupled to anodes of the four white LEDs and provides a driving voltage Vout for these white LEDs. The switchable current sink 220 is coupled to cathodes of the same four white LEDs and regulates a current I_BL through these four white LEDs. The reference circuit 230 is coupled to the switchable current sink 220 at nodes 205, 207, 209 and 211. The reference circuit 230 is further coupled to the DC-DC converter 210 at node 201. By detecting voltages VLED1, VLED2, VLED3 and VLED4, wherein VLED1 is the voltage at node 205, VLED2 is the voltage at node 207, VLED3 is the voltage at node 209, and VLED4 is the voltage at node 211, the reference circuit 230 may provide a reference voltage Vref at node 201 to the DC-DC converter 210. According to the reference voltage Vref, the DC-DC converter 210 may regulate the driving voltage Vout to a desired voltage level.

The DC-DC converter 210 includes a converting unit 228, a controller 212, a feedback circuit 232 and a comparator 234. The converting unit 228 is used to convert a DC input voltage Vin to the driving voltage Vout and in one exemplary embodiment, the converting unit 228 includes four switches SW1, SW2, SW3 and SW4, and an inductor L. Proper combinations of the four switches may determine if the DC-DC converter 210 operates in a BOOST mode, a BUCK-BOOST mode or a BUCK mode. The controller 212 is used to provide control signals SW1_ON, SW2_ON, SW3_ON and SW4_ON to the converting unit 228, and each control signal is connected to a respective switch and controls its conducting state. The feedback circuit 232 may scale the driving voltage Vout down to a feedback voltage Vfb on path 213. Then the comparator 234 compares the feedback voltage Vfb with the reference voltage Vref to output a signal VOUT_LOW to the controller 212. The signal VOUT_LOW may start a new switching cycle of the control signals when VOUT_LOW changes from a low voltage to a high voltage, that is, VOUT_LOW is active.

The controller 212 of the DC-DC converter 210 includes a control unit 214, an activation generator 216, a disactivation generator 218 and a converter mode detector 222. The control unit 214 generates the control signals according to various inputs. A switching cycle of the control signals consists of a TON time interval and a TOFF time interval. The activation generator 216 is connected to the control unit 214 to control the duration of the TON time interval. The disactivation generator 218 is connected to the control unit 214 to control the duration of the TOFF time interval. The activation generator 216 and the disactivation generator 218 receive the DC input voltage Vin from external power supply and the reference voltage Vref from the reference circuit 230 to calculate the TON time interval and TOFF time interval. The converter mode detector 222 receives the reference voltage Vref and provides mode signals BUCK, BOOST, and BUCK-BOOST to the control unit 214. The mode signals control a switching sequence of the control signals and the switching sequence may determine the conducting state combination of the four switches, and consequently determine operation mode of the DC-DC converter 210.

The switchable current sink 220 is provided with a LED current control signal through path 203. The LED current control signal may be a digital or analog signal and controls the current I_BL flowing through the four white LEDs. The switchable current sink 220 further provides a reference voltage V_DROP to the reference circuit 230.

The reference circuit 230 includes a minimum selector 224 and an error amplifier 226. Because forward voltages of the four white LEDs may differ slightly from each other, the minimum selector 224 is included in the circuit to ensure that the white LED with the highest forward voltage has sufficient operating voltage from the driving voltage Vout. The minimum selector 224 is connected to the switchable current sink 220 at nodes 205, 207, 209 and 211. With the current setting for each of the four white LEDs regulated by the switchable current sink 220, the reference circuit 230 detects the voltages VLED1, VLED2, VLED3 and VLED4 and selects a minimum voltage VLED_MIN among them. Then the selected minimum voltage VLED_MIN is delivered to the error amplifier 226 through path 217. The error amplifier 226 also receives the reference voltage V_DROP through path 219. Based on the VLED_MIN and V_DROP, the error amplifier 226 regulates the reference voltage Vref. Whenever the VLED_MIN drops below the V_DROP, it is determined that the Vout is not sufficient and the Vref is increased. Conversely, when the VLED_MIN is above the V_DROP, the Vout is too high and the Vref is decreased. By changing the Vref, the DC-DC converter 210 will regulate the Vout accordingly until the difference between the Vfb and the Vref is small, which is within ±30 mV. Finally, the VLED_MIN is regulated to be equal to the V_DROP and the Vout is regulated to the desired voltage level.

FIG. 3 is a table illustrating states of the four switches in FIG. 2A. In the BOOST mode, switches SW1 and SW2 are kept permanently ON and OFF respectively. Switches SW3 and SW4 are turned ON and OFF alternately. In this case, the TON time interval refers to SW3 turn-on duration and the TOFF time interval refers to SW4 turn-on duration. The DC-DC converter 210 converts the DC input voltage Vin to the driving voltage Vout, which is higher than the Vin. In the BUCK-BOOST mode, the four switches are turned ON and OFF alternately in pairs. For example, switches SW1 and SW3 turn ON as a pair, and switches SW2 and SW4 turn OFF as a pair, then switches SW1 and SW3 turn OFF, and switches SW2 and SW4 turn ON. In this case, the TON time interval refers to the turn-on duration of switches SW1 and SW3, and the TOFF time interval refers to the turn-on duration of switches SW2 and SW4. The DC-DC converter 210 converts the DC input voltage Vin to the driving voltage Vout which is from slightly below to slightly above the Vin. In the BUCK mode, switches SW4 and SW3 are both kept permanently ON and OFF. Then switches SW1 and SW2 are turned ON and OFF alternately. In this case, the TON time interval refers to SW1 turn-on duration and the TOFF time interval refers to SW2 turn-on duration. The DC-DC converter 210 converts the DC input voltage Vin to the driving voltage Vout, which is lower than the Vin.

FIG. 4 is a table illustrating equations used for calculating the switching cycle of the four control signals in FIG. 2A. The TON time interval and TOFF time interval of the switching cycle are calculated based on the equations wherein K is a constant and D is a feedback factor equal to Vout/Vfb. There are two groups of equations. The first group of equations is applicable when the voltage difference between the Vfb and the Vref is small. The second group of equations is applicable when the Vfb is smaller than the Vref and there is a large difference between them. In this case, a parametric acceleration (not shown in FIG. 2A) is applied to shorten the TOFF time interval and increase the rising speed of the Vout. It allows a faster converter response time with a sudden load increase. This acceleration is proportional to the difference between the Vfb and the Vref.

Figure 5:
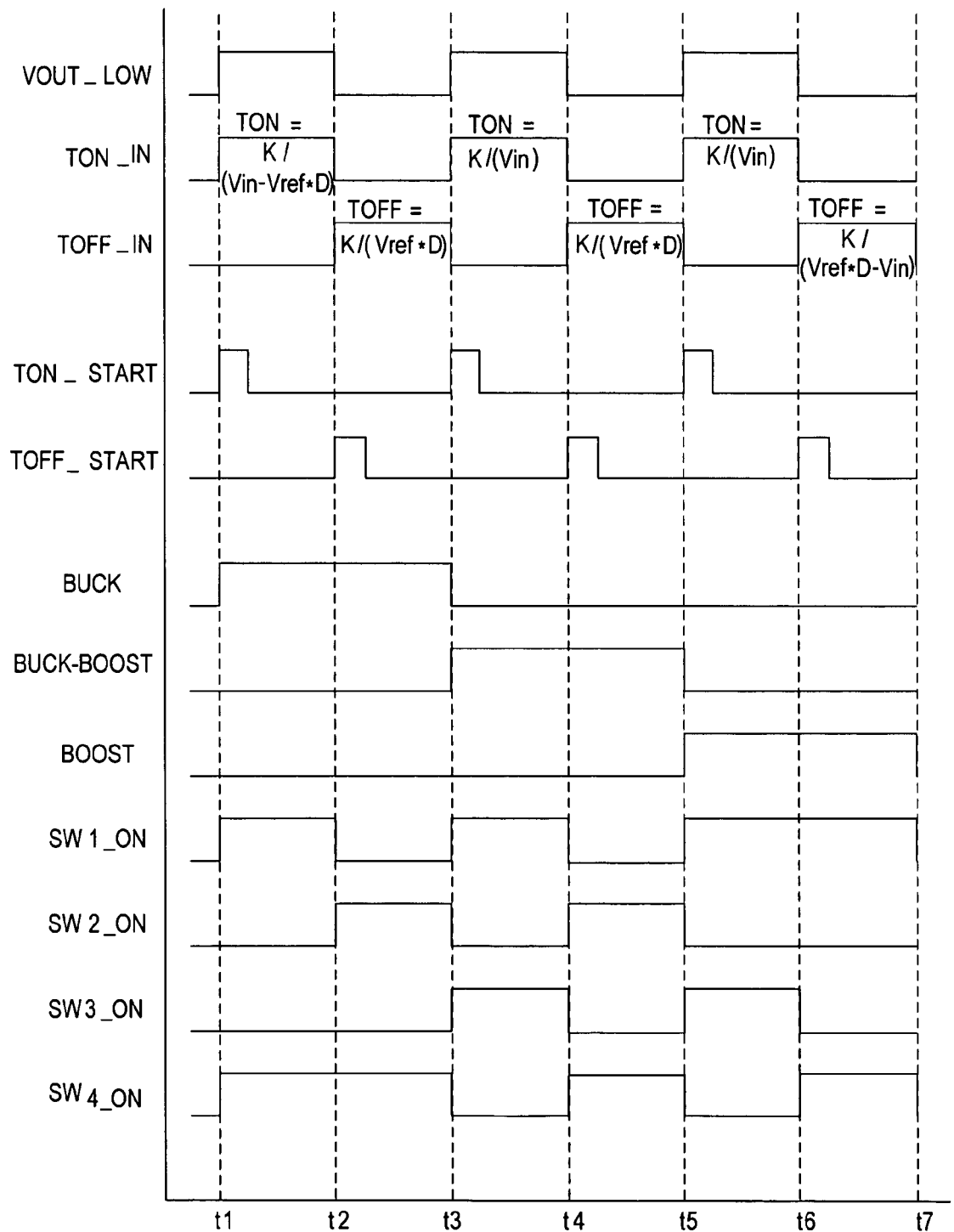
FIG. 5 is a timing diagram illustrating the operation of the DC-DC converter 210 in FIG. 2A.

FIG. 5 is a timing diagram illustrating the operation of the DC-DC converter 210 in FIG. 2A. In the operation, it is assumed that the voltage difference between the Vfb and the Vref is small. In the timing diagram, various input and output signals of the control unit 214 are illustrated over time. From t1 to t3, the DC-DC converter 210 operates in the BUCK mode. At t1, the Vfb drops below the Vref, VOUT_LOW is active. This triggers TON_START on path 221 and enables the activation generator 216 to start the TON time interval from t1 to t2. TON_IN on path 223 represents the TON time interval. After the TON time interval has elapsed, TOFF_START on path 225 is triggered and the disactivation generator 218 starts the TOFF time interval from t2 to t3. TOFF_IN on path 227 represents the TOFF time interval. When the TOFF time interval has elapsed, one complete switching cycle ends. At t3, VOUT_LOW is again active and a new switching cycle will start. From t3 to t5, the switching cycle is for the BUCK-BOOST mode, and from t5 to t7, the switching cycle is for the BOOST mode. It is indicated in the timing diagram that in each mode, the switching sequence and the calculation of the switching cycle of the control signals SW1_ON, SW2_ON, SW3_ON and SW4_ON are different.

Figure 6A:
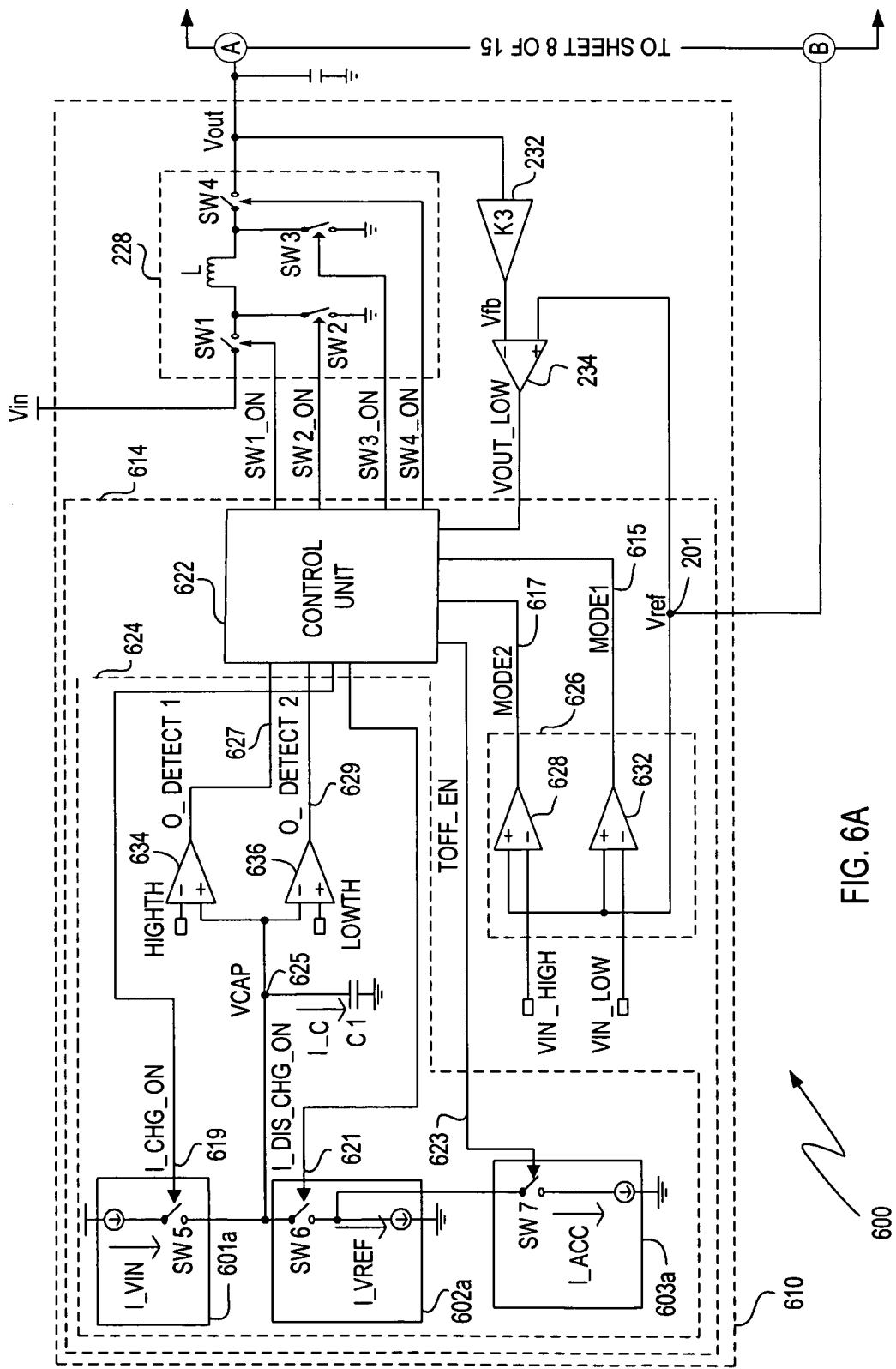
FIG. 6A and FIG. 6B illustrate a schematic diagram of another exemplary embodiment.
Figure 6B:
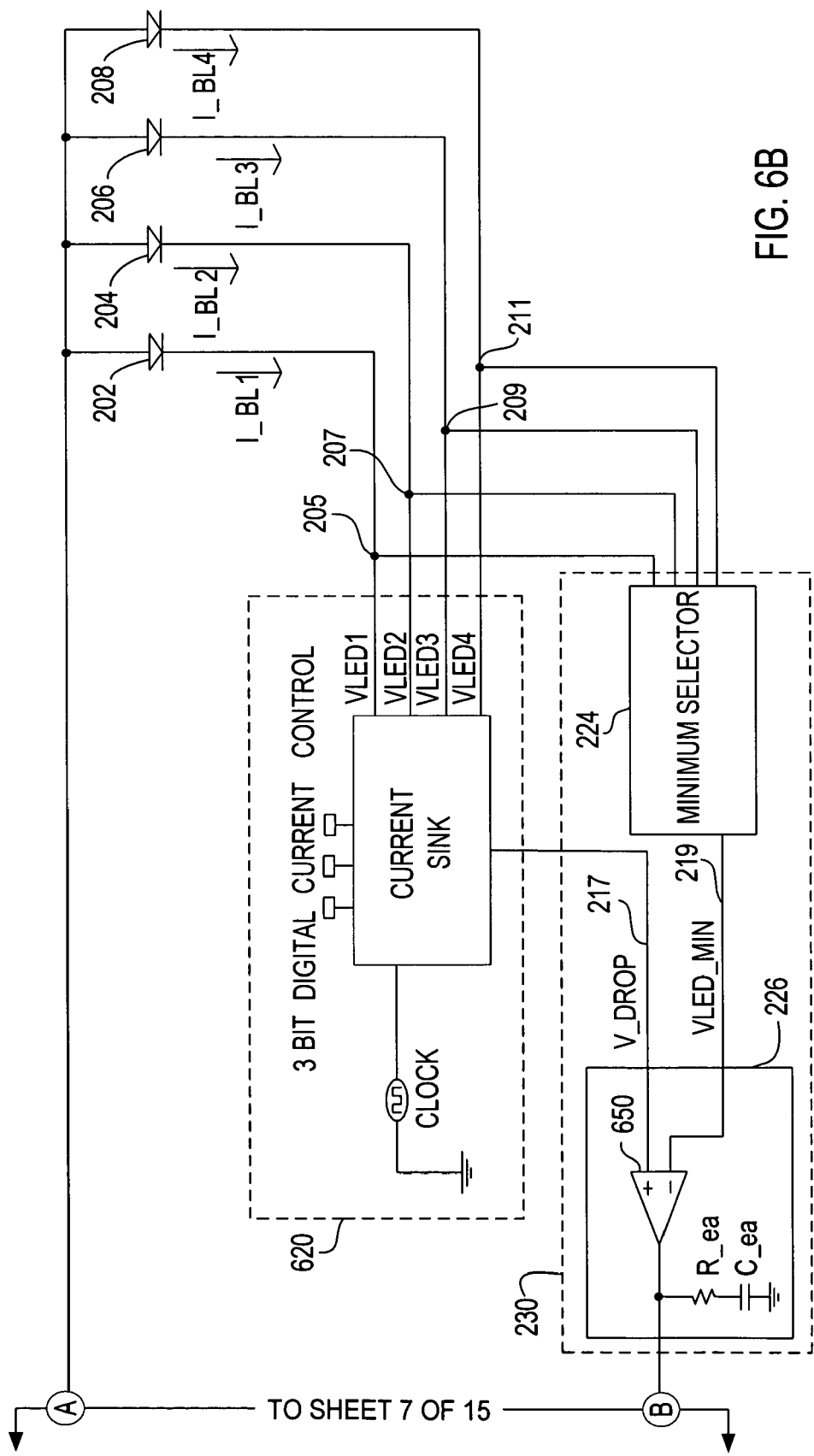

FIG. 6A and FIG. 6B illustrate a schematic diagram of an embodiment 600. Many components in FIG. 6A and FIG. 6B are similar to those in FIG. 2A and FIG. 2B, therefore, descriptions of these similar components are omitted herein for clarity. Only the differences and improvements will be further described herein in details. In the embodiment, a DC-DC converter 610 is used to provide the driving voltage Vout for the four white LEDs. A switchable current sink 620 is used to regulate the currents I_BL1, I_BL2, I_BL3 and I_BL4 respectively flowing through the four white LEDs.

The DC-DC converter 610 includes the converting unit 228, a controller 614, the comparator 234 and the feedback circuit 232. The feedback circuit 232 is realized by an amplifier and the Vfb divided by the Vout is defined as K3.

The controller 614 of the DC-DC converter 610 includes a control unit 622, a time interval generator 624 and a converter mode detector 626. The control unit 626 generates the control signals SW1_ON, SW2_ON, SW3_ON and SW4_ON according to various inputs. The time interval generator 624 is connected to the control unit 622 to control the duration of the TON time interval and the TOFF time interval. The converter mode detector 626 receives the reference voltage Vref at node 201 and provides mode signals MODE1 on path 615 and MODE2 on path 617 to the control unit 622.

The time interval generator 624 of the controller 614 includes a current source 601a and two current sinks 602a and 603a. A sourcing current I_VIN flows through the current source 601a, a sinking current I_VREF flows through the current sink 602a, and a sinking current I_ACC flows through the current sink 603a. Switches SW5, SW6 and SW7 are respectively controlled by the control unit 622 through an I_CHG_ON signal on path 619, an I_DIS_CHG_ON signal on path 621, and a TOFF_EN signal on path 623. A current I_C flows through a capacitor C1 and results in a voltage VCAP at node 625. When signals on paths 619, 621 and 623 change, the current I_C will be changed accordingly. With different current I_C flowing through the capacitor C1, the voltage VCAP will be different. The Voltage VCAP is delivered to a comparator 634 for comparison with a voltage HIGHTH and to a comparator 636 for comparison with a voltage LOWTH. The comparator 634 outputs a signal O_DETECT1 on path 627 to the control unit 622 and an active O_DETECT1 initiates a TOFF cycle. The comparator 636 outputs a signal O_DETECT2 on path 629 to the control unit 622 and an active O_DETECT2 indicates the end of the TOFF cycle, that is, the beginning of a new switching cycle.

The converter mode detector 626 of the controller 614 is formed by comparators 628 and 632. When the received reference voltage Vref is below a voltage VIN_LOW, both MODE1 and MODE2 are inactive and the DC-DC converter 610 will operate in the BUCK mode. When the reference voltage Vref is above a voltage VIN_HIGH, both MODE1 and MODE2 are active and the DC-DC converter 610 will operate in the BOOST mode. Lastly, when the reference voltage Vref is between the VIN_HIGH and the VIN_LOW, MODE1 and MODE2 are active and inactive respectively and the DC-DC converter 610 will operate in the BUCK-BOOST mode. The VIN_HIGH and the VIN_LOW are determined according to the equations 1) and 2).

$$VIN\_LOW = K4 * Vin * K3 \qquad 1)$$

$$VIN\_HIGH = K5 * Vin * K3 \qquad 2)$$

K3, K4 and K5 may be ⅜, 0.95 and 1.05 respectively.

The switchable current sink 620 includes a clock and a current sink. The current sink is connected to the white LEDs and regulates the currents flowing through them. The regulation is controlled by current control signals inputted through 3 bit digital current control terminals. The clock may provide selector signals to the current sink. According to the selector signals, the current sink will select only one white LED current to be regulated at any one time, and the four white LED currents are regulated sequentially. For example, I_BL1 is regulated first followed by I_BL2, I_BL3 and lastly I_BL4. After I_BL4, the sequence is repeated. The switchable current sink 620 further provides a reference voltage V_DROP to the reference circuit 230.

The error amplifier 226 of the reference circuit 230 is formed by an operational amplifier 650 and a resistor and capacitor network consisting of a resistor R_ea and a capacitor C_ea. The non-inverting terminal of the operational amplifier 650 receives the voltage V_DROP, the inverting terminal receives the voltage VLED_MIN, and the output terminal is connected to the resistor and capacitor network at node 201 to output the reference voltage Vref.

Figure 7:
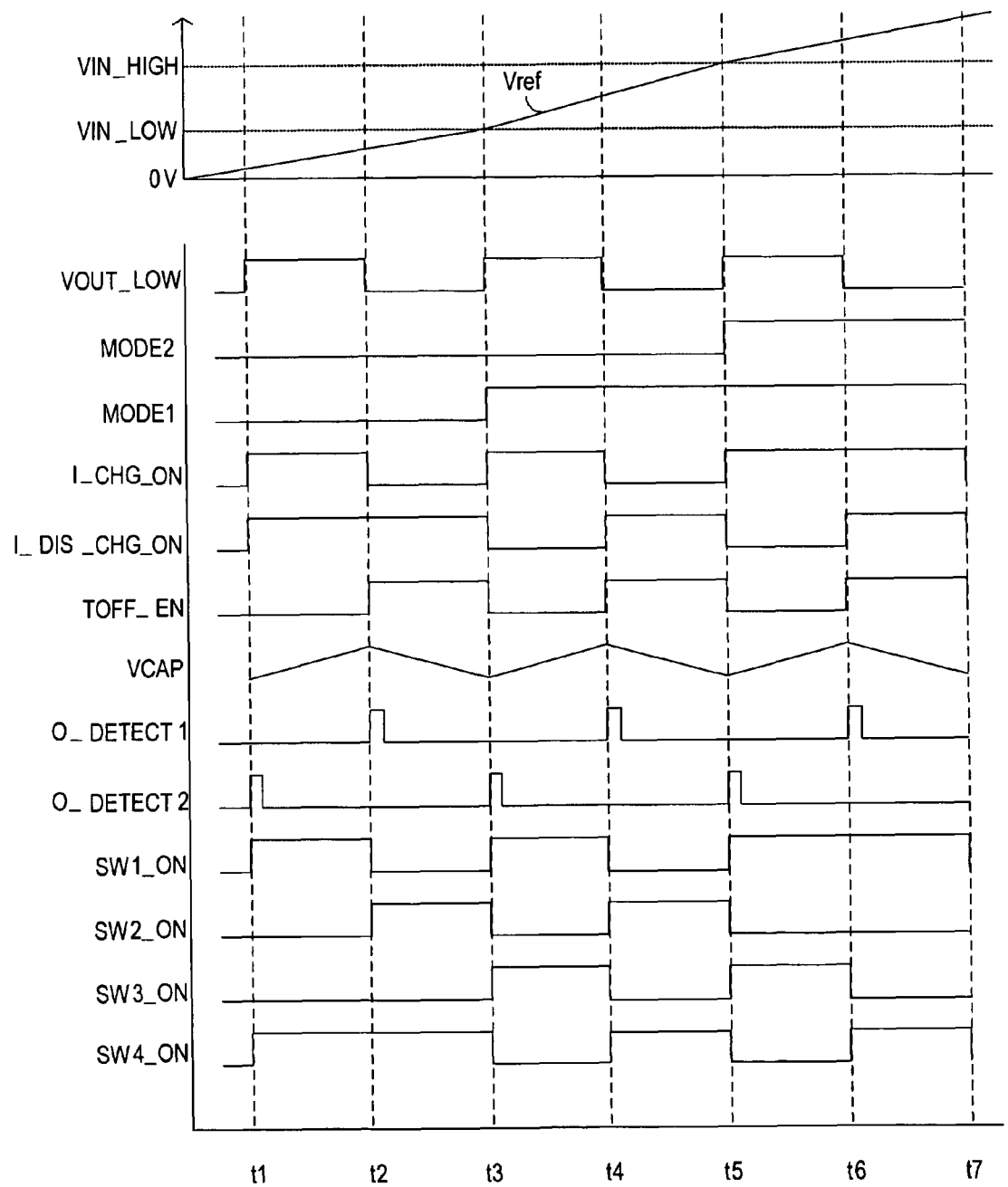
FIG. 7 is a timing diagram illustrating the operation of the DC-DC converter 610 in FIG. 6A.

FIG. 7 is a timing diagram illustrating the operation of the DC-DC converter 610 in FIG. 6A. From t1 to t3, the Vref is below the VIN_LOW, and the DC-DC converter 610 operates in the BUCK mode. When VOUT_LOW is active at t1, the TON cycle is initiated. I_CHG_ON on path 619 and I_DIS_CHG_ON on path 621 are active, and switches SW5 and SW6 are turned on. This results in the current I_C equal to I_VIN minus I_VREF that charges up the capacitor C1. The voltage VCAP starts to increase until it reaches the voltage HIGHTH at t2. O_DETCT1 now becomes active and initiates the TOFF cycle from t2 to t3. During the TOFF cycle, I_CHG_ON is inactive and I_DIS_CHG_ON is active. The switch SW5 is turned off and the switch SW6 remains on. Now the capacitor C1 discharges with the current I_C equal to I_VREF and the voltage VCAP decreases until it reaches the voltage LOWTH at t3. At t3, O_DETECT2 becomes active, indicating the end of TOFF cycle and the start of a new switching cycle. I_VIN and I_VREF are determined by the equations 3) and 4) respectively.

$$I\_VIN = K1 * Vin / R1 \qquad 3)$$

$$I\_VREF = K2 * Vref / R1 \qquad 4)$$

K1 and K2 may be ¼ and ⅔ respectively. R1 may be 80E3Ω. Assuming the Vfb and the Vref are approximately equal, K1=K2*K3, D=1/K3 and the voltage difference between the voltage HIGHTH and the voltage LOWTH is 1 volt, it can be shown that the TON cycle for the BUCK mode, between t1 and t2, can be determined by the equation 5).

$$TON|_{BUCK} = (C1 * R1 / K1) / (Vin - Vref * D) \qquad 5)$$
$$= K / (Vin - Vref * D)$$

where C1 is the capacitance of C1 where K=C1*R1/K1

Also, the TOFF cycle for the BUCK mode, between t2 and t3, can be determined by the equation 6).

$$TOFF|_{BUCK} = (C1 * R1 / K1) / (Vref * D) \qquad 6)$$
$$= K / (Vref * D)$$

where C1 is the capacitance of C1 where K=C1*R1/K1

C1 may be 5.25E-12 Farad. Using the results from equations 5) and 6), the duty cycle for the DC-DC converter 610 from t1 to t3 can be calculated by the equation 7).

$$Duty|_{BUCK} = TON / (TON + TOFF) \qquad 7)$$
$$= (Vref * D) / Vin$$

Since D is equal to Vout/Vfb and the Vref is approximately equal to the Vfb, the equation 7) can be rewritten as Duty|$_{BUCK}$=Vout/Vin which is the well known equation for a BUCK converter. Using similar methods as above, the TON and TOFF cycle for the BUCK-BOOST mode and the BOOST mode may be calculated by the equations 8) and 9). In the BUCK-BOOST mode, from t3 to t4, the current I_C is equal to I_VIN, therefore, the TON cycle is calculated by the equation 8).

$$TON|_{BUCK\text{-}BOOST} = (C1 * R1 / K1) / (Vin) \qquad 8)$$
$$= K / (Vin)$$

From t4 to t5, the current I_C is equal to I_VREF, therefore, the TOFF cycle is calculated by the equation 9).

$$TOFF|_{BUCK\text{-}BOOST} = (C1 * R1 / K1) / (Vref * D)) \qquad 9)$$
$$= K / (Vref * D)$$

The resultant duty cycle in the BUCK-BOOST mode is calculated by the equation 10).

$$Duty|_{BUCK\text{-}BOOST} = Vout / (Vout + Vin). \qquad 10)$$

In the BOOST Mode, from t5 to t6, the current I_C is equal to I_VIN, therefore, the TON cycle is calculated by the equation 11).

$$TON|_{BOOST} = (C1 * R1 / K1) / (Vin) \qquad 11)$$
$$= K / (Vin)$$

From t6 to t7, I_C is equal to I_VREF minus I_VIN, therefore, the TOFF cycle is calculated by the equation 12).

$$TOFF|_{BOOST} = (C1*R1/K1)/(Vref*D-Vin) \qquad 12)$$
$$= K/(Vref*D-Vin)$$

Again, the resultant duty cycle in the BOOST mode is calculated by the equation 13).

$$Duty|_{BOOST} = (Vout-Vin)/Vout. \qquad 13)$$

During the TOFF cycles of from t2 to t3, from t4 to t5 and from t6 to t7, TOFF_EN is active and the switch SW7 is turned on. This induces the acceleration current I_ACC to affect the duration of the TOFF cycle. The current I_ACC increases the resultant current I_C which discharges the capacitor C1. For example, from t4 to t5, the resultant current I_C is equal to I_VREF plus I_ACC instead of I_VREF. This will shorten the TOFF time interval and speed up the response of the Vout when the difference between the Vfb and the Vref is large. The value of the current I_ACC may be determined by Ka(Vref−Vfb).

Figure 8:
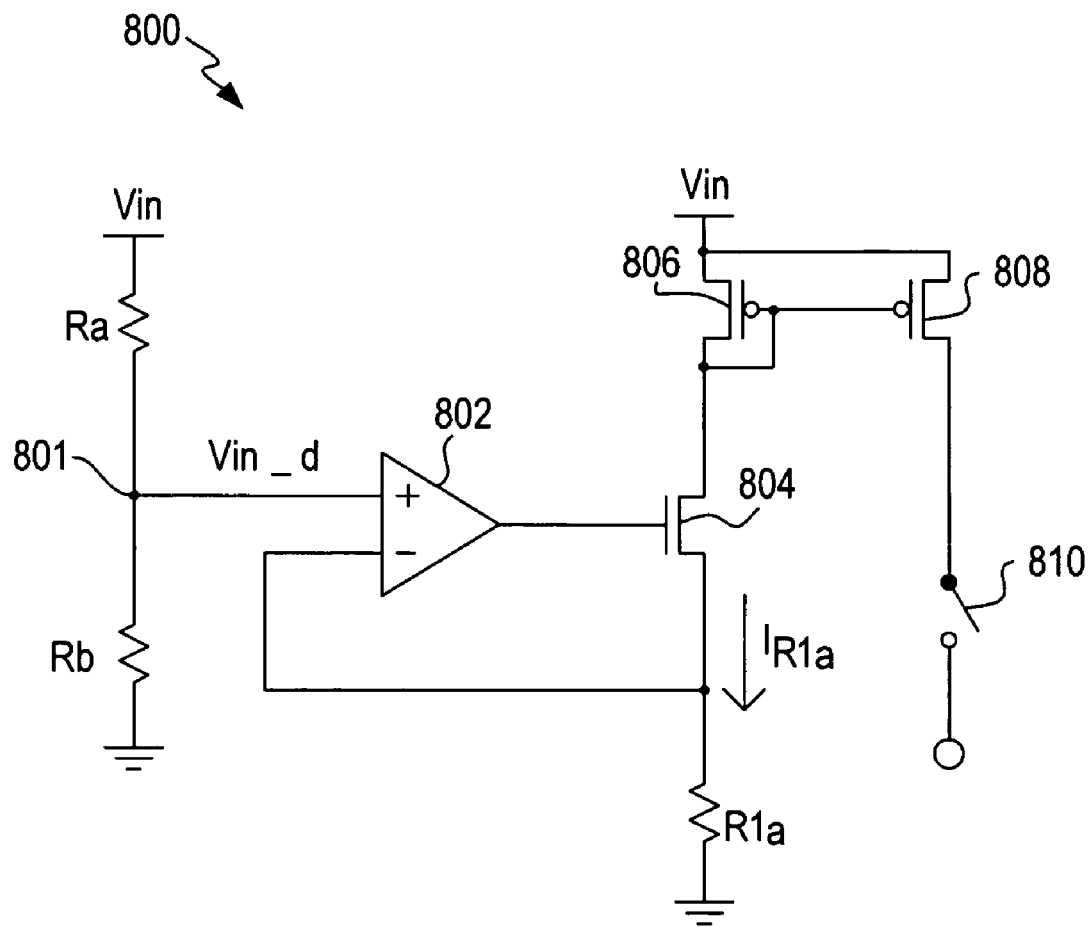
FIG. 8 is a schematic diagram of the current source 601a in FIG. 6A according to one embodiment.

FIG. 8 is a schematic diagram of the current source 601a in FIG. 6A according to one embodiment 800. A voltage divider formed by resistors Ra and Rb scales down the DC input voltage Vin to a lesser voltage level Vin_D at node 801 where Vin_D=(Rb/(Ra+Rb))*Vin. A voltage follower formed by an operational amplifier 802 and a transistor 804 replicates the voltage Vin_D across a resistor R1a. The resistance of the resistor R1a may be the same value as R1 in the equation 3), which then results in a current $I_{R1a}$ flowing through the resistor R1a and the transistors 804 and 806. A current mirror formed by transistors 806 and 808 then mirrors the current $I_{R1a}$ to a switch 810. The final current flowing through the switch 810 represents the current level provided by the current source 601a in FIG. 6A given by I_VIN=K1/R1*Vin where K1=Rb/(Ra+Rb) and R1=R1a.

Figure 9:
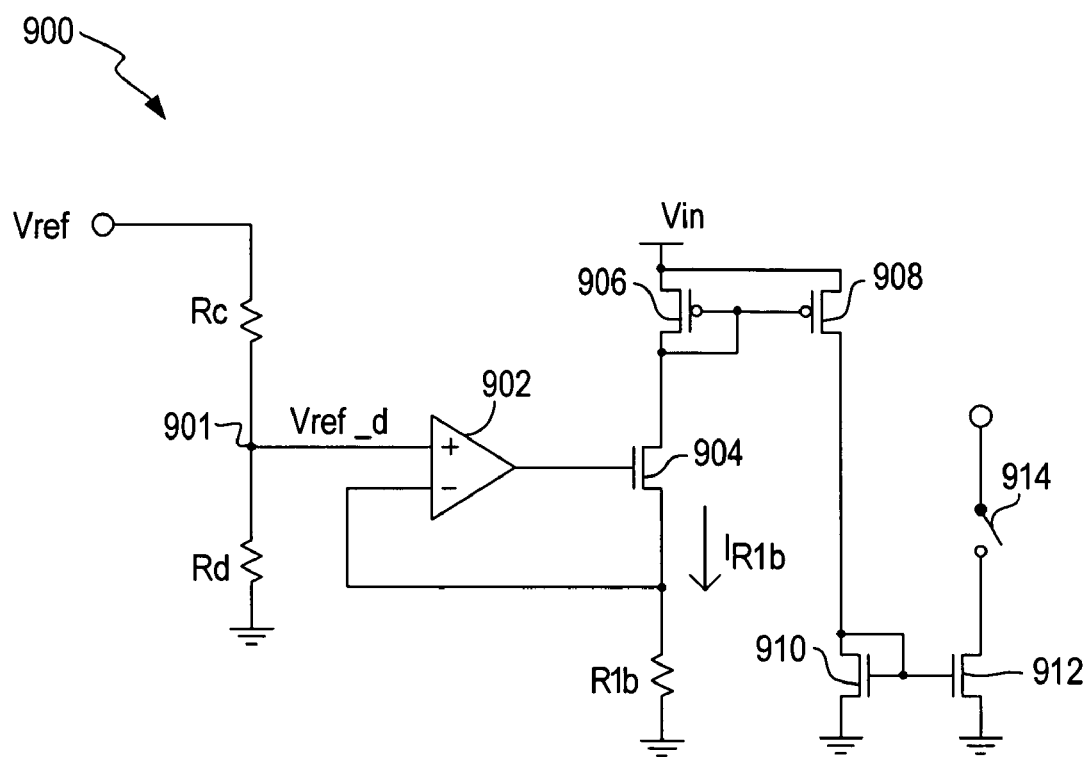
FIG. 9 is a schematic diagram of the current sink 602a in FIG. 6A according to one embodiment.

FIG. 9 is a schematic diagram of the current source 602a in FIG. 6A according to one embodiment 900. A voltage divider formed by resistors Rc and Rd scales down the voltage Vref to a smaller voltage level Vref_D at node 901 where Vref_D=(Rd/(Rc+Rd))*Vref. A voltage follower formed by an operational amplifier 902 and a transistor 904 replicates the voltage Vref_D across a resistor R1b. The resistance of the resistor R1b may be the same value as R1 in the equation 3), which then results in a current $I_{R1b}$ flowing through the resistor R1b and the transistors 904 and 906. Current mirrors formed by transistors 906, 908, 910 and 912 mirror the current $I_{R1b}$ to a switch 914. The final current flowing through the switch 914 represents the current level provided by the current sink 602a in FIG. 6A given by I_VREF=(K2/R1)*Vref where K2=Rd/(Rc+Rd) and R1=R1b.

Figure 10:
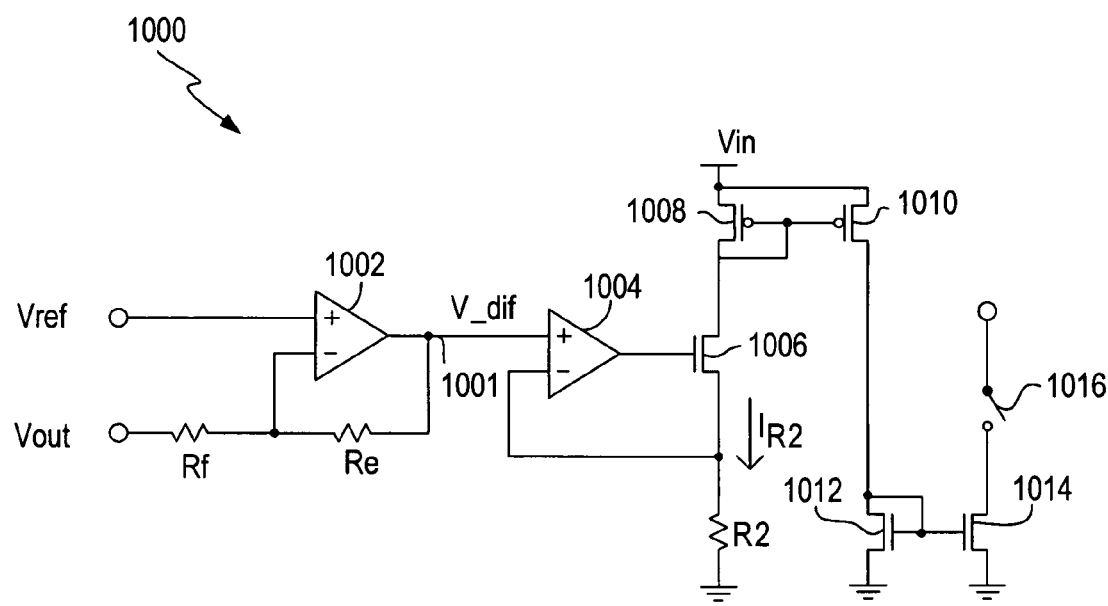
FIG. 10 is a schematic diagram of the current sink 603a in FIG. 6A according to one embodiment.

FIG. 10 is a schematic diagram of the current source 603a in FIG. 6A according to one embodiment 1000. A differential amplifier formed by resistors Re and Rf and an operational amplifier 1002 provides a voltage V_diff at node 1001 which is equivalent to the difference in voltage between the Vfb and the Vref in FIG. 6A. In FIG. 10, V_diff=(Vref*(1+Re/Rf)−Vout*Re/Rf). If K3=(Re/(Re+Rf)), then it can be shown that V_diff=(1+Re/Rf)*(Vref−Vfb). By replicating V_diff across a resistor R2 with a voltage follower formed by an operational amplifier 1004 and a transistor 1006, a current $I_{R2}$ flows through the resistor R2 and the transistors 1006 and 1008. A current mirror formed by transistors 1008, 1010, 1012 and 1014 mirrors the current $I_{R2}$ to a switch 1016. The final current flowing through the switch 1016 may represent the current level provided by the current sink 603a in FIG. 6A given by I_ACC=Ka(Vref−Vfb) where Ka=(1+Re/Rf).

Figure 11:
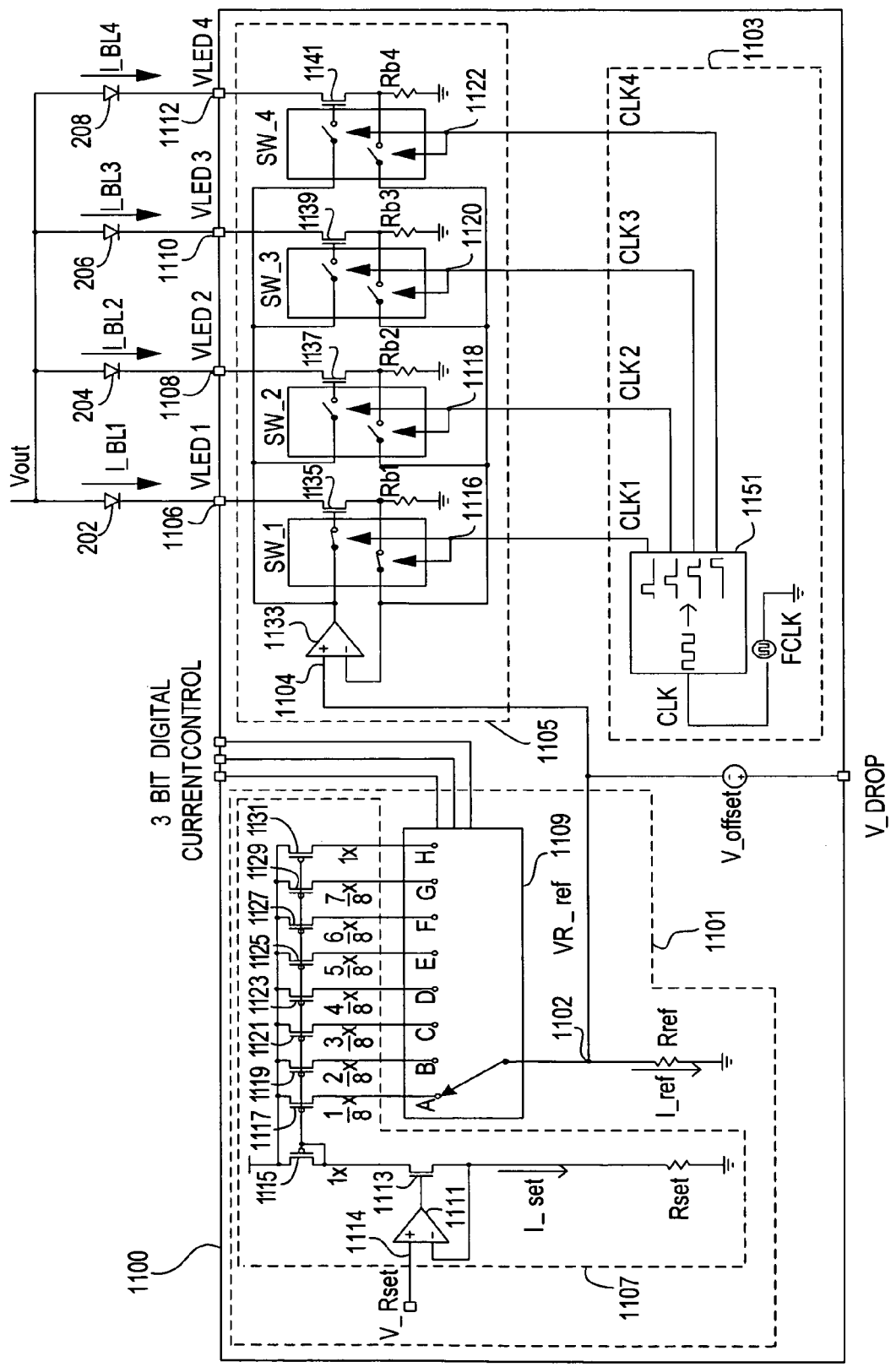
FIG. 11 is a schematic diagram of the switchable current sink 620 in FIG. 6B according to one embodiment.

FIG. 11 is a schematic diagram of one embodiment of the switchable current sink 620 in FIG. 6B. In FIG. 11, certain portions of the embodiment 600 depicted in FIG. 6B have been omitted for clarity, but it is to be understood that like parts of FIG. 11 can be implemented in a manner consistent with the embodiment depicted in FIG. 6B, or alternatively in other system implementations, without departing from this embodiment.

In this embodiment, a switchable current sink 1100 may include a current control circuit 1101, a connection circuit 1105 and a selector signal generator 1103. The current control circuitry 1101 generates a reference voltage VR_ref at node 1102 which controls the currents flowing through the four white LEDs, namely I_BL1, I_BL2, IBL3 and I_BL4. The connection circuit 1105 receives the reference voltage VR_ref through a reference input terminal 1104. At the same time, the connection circuit 1105 receives the currents I_BL1, I_IBL2, IBL3 and I_BL4 which flow through the four white LEDs, pass current terminals 1106, 1108, 1110 and 1112, and then sink into the connection circuit 1105. According to the VR_ref, the connection circuit 1105 regulates the currents I_BL1, I_BL2, IBL3 and I_BL4. The selector signal generator 1103 is coupled to the connection circuit 1105 at selector terminals 1116, 1118, 1120 and 1122. The selector signals generator 1103 is capable of providing selector signals to the connection circuit 1105. Controlled by these selector signals, the connection circuit 1105 selects a certain white LED current to be regulated at any one time.

The current control circuit 1101 of the switchable current sink 1100 includes a set of current sources 1107 capable of outputting a plurality of currents, a current selector 1109 and a resistor Rref. To form the set of current sources 1107, a voltage follower formed by an operational amplifier 1111 and a transistor 1113 replicates a voltage V_Rset on path 1114 across a resistor Rset. This results in a current I_set flowing through the resistor Rset and transistors 1113 and 1115. The current I_set is then mirrored to transistors 1117, 1119, 1121, 1123, 1125, 1127, 1129 and 1131 which form a set of current mirrors in company with the transistor 1115. The currents flowing through 1117, 1119, 1121, 1123, 1125, 1127, 1129 and 1131 are multiples of $\frac{1}{8}^{th}$ of the current I_set. The current selector 1109 is connected to the set of current sources 1107 at position terminals A, B, C, D, E, F, G and H. Controlled by current control signals at 3 bit digital current control terminals, the current selector 1109 selects one of the set of current sources coupled to a certain position terminal. This leads to the current provided by the selected current source to flow through the current selector and into a resistor Rref, which is connected with the current selector. The current flowing through Rref is defined as I_ref. The current I_ref results in the voltage VR_ref across the resistor Rref.

The connection circuit 1105 of the switchable current sink 1100 includes an operation amplifier 1133, four switch sets SW_1, SW_2, SW_3 and SW_4, four transistors 1135, 1137, 1139 and 1141, and four resistors Rb1, Rb2, Rb3 and Rb4. A non-inverting terminal of the operational amplifier 1133 serves as the reference input terminal of the connection circuit 1105 to receive the reference voltage VR_ref. Switch set SW_1 connects the output terminal of the operational amplifier 1133 to a gate terminal of the transistor 1135, and connects the inverting terminal of the operational amplifier 1133 to a source terminal of the transistor 1135. The conducting state of the switch set SW_1 is controlled by a selector signal provided at a selector terminal 1116 of the switch set SW_1. The resistor Rb1 is connected between the source terminal of the transistor 1135 and ground. The drain terminal of the transistor 1135 serves as a current terminal to be connected with the white LED 202. The transistor 1135 and the resistor Rb1 form a current sinking path which the current I_BL1 flows through. In a similar manner, the remaining transistors and resistors form current sinking paths which I_BL2, I_BL3 and I_BL4 flow through. These current sinking paths are connected with the operational amplifier 1133 through switch sets SW_2, SW_3 and SW_4 respectively.

The selector signal generator 1103 of the switchable current sink 1100 includes a clock generator FCLK and a frequency divider 1151. The clock generator generates a clock signal CLK. The clock signal CLK is provided to the frequency divider 1151 to generate four select signals CLK1, CLK2, CLK3 and CLK4. Each select signal is connected to a switch set to control its conducting state. For example, the conducting state of the switch set SW_1 is controlled by the selector signal CLK1. When the switch set SW_1 is turned on by an active CLK1, the operational amplifier 1131 and the transistor 1135 form a voltage follower and the reference voltage VR_ref is replicated across the resistor Rb1. The VR_ref results in I_BL1 flowing through the resistor Rb1, the transistor 1135 and the white LED 1143. In a similar manner, I_BL2, IBL3 and I_BL4 are regulated when CLK2, CLK3 and CLK4 are active respectively. Therefore, the current level I_BL is determined by the equation 14).

$$I\_BL = I\_set * KI * KR \quad\quad 14)$$

Where I_set=V_Rset/Rset, KI=I_ref/I_set, KR=Rb/Rref, I_BL=I_BL1=I_BL2=I_BL3=I_BL4 and Rb=Rb1=Rb2=Rb3=Rb4. Possible values for V_Rset, Rset, Rb and Rref are 0.6V, 10E3Ω, 5.5Ω and 1.1E3Ω. Using these values and selecting the current selector 1109 to position 'H', the current setting for I_BL is 12 mA.

Other than controlling the currents, the circuitry in switchable current sink 1100 also generates the reference voltage V_DROP used to set the minimum voltage VLED_MIN. To do that, an offset voltage V_offset is added to the VR_ref to generate the V_DROP. The V_offset ensures that sufficient drain to source voltage is maintained across transistors 1135, 1137, 1139 and 1141. The V_offset voltage level may be 50 mV. Thus, the minimum voltage VLED_MIN can be calculated by the equation 15).

$$VLED\_MIN = I\_BL * Rb + V\_offset \quad\quad 15)$$

Also in this way, it ensures that the minimum voltage drop across the switchable current sink is maintained for high efficiency. The VLED_MIN voltage level may be 72 mV when I_BL=4 mA, Rb=5.5Ω and V_offset=50 mV.

Figure 12:
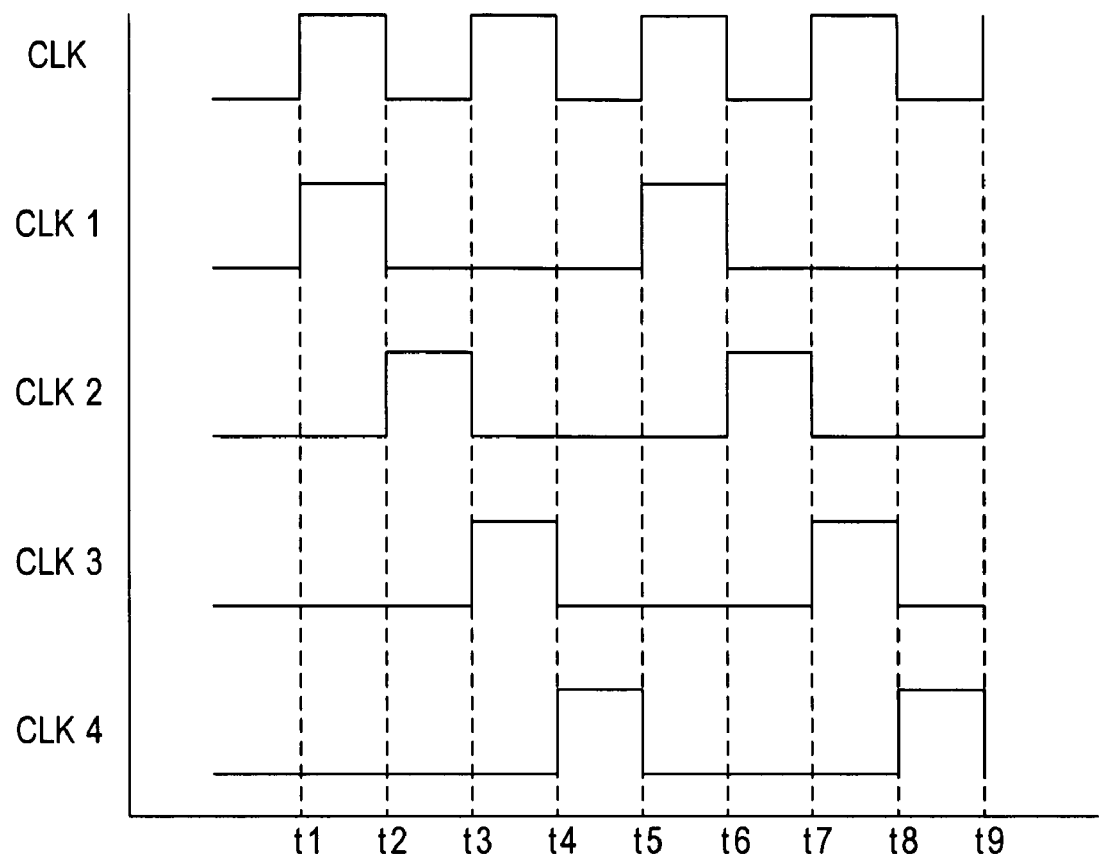
FIG. 12 is a timing diagram illustrating the operation of the selector signal generator 1103 in FIG. 11.

FIG. 12 is a timing diagram illustrating the operation of the selector signal generator 1103 in FIG. 11. Each of the four selector signals is 90 degree phase shifted from the preceding one so that only one selector signal is active at any one time.

Figure 13:
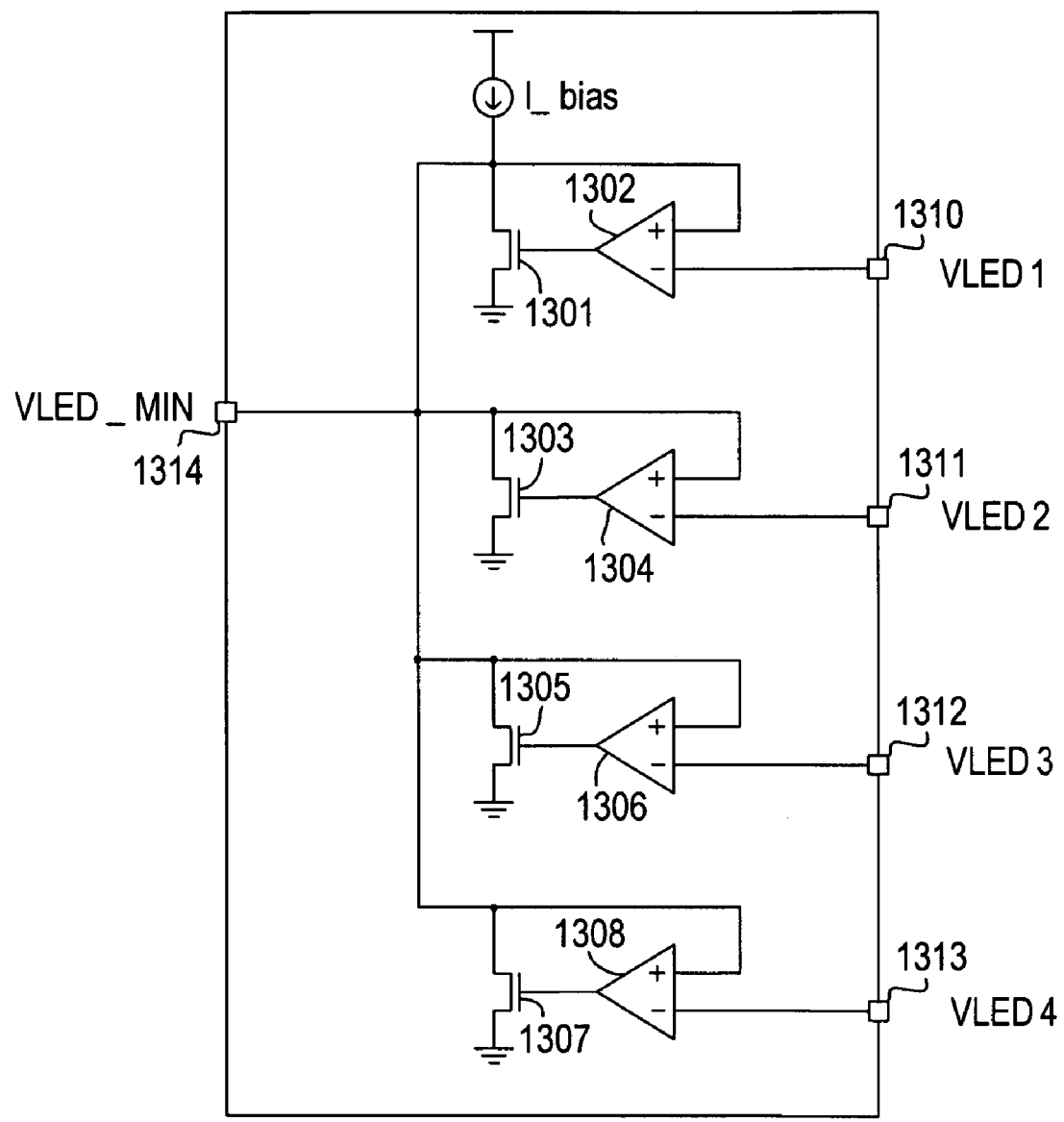
FIG. 13 is a schematic diagram of the minimum selector 646 in FIG. 6B according to one embodiment.

FIG. 13 is a schematic diagram 1300 of one embodiment of the minimum selector 646 of FIG. 6B. There are four voltage followers. Each voltage follower is formed by an operational amplifier and a transistor. One example is the voltage follower formed by an operation amplifier 1302 and a transistor 1301. Each voltage follower is designed such that it has greater current sinking capacity than a current source I_bias. In this way, only the lowest voltage among VLED1, VLED2, VLED3 and VLED4 is replicated on VLED_MIN, wherein VLED1 is the voltage at a terminal 1310, VLED2 is the voltage at a terminal 1311, VLED3 is the voltage at a terminal 1312, VLED4 is the voltage at a terminal 1313, and VLED_MIN is the voltage at a terminal 1314.

The embodiments that have been described herein are some of the several possible embodiments that utilize this invention and they are described here by way of illustration and not of limitation. It is obvious that many other embodiments, which will be readily apparent to those skilled in the art, may be made without departing materially from the spirit and scope of the invention as defined in the appended claims. Although the invention has been described for use with white LEDs, the invention is equally applicable for other LEDs or electrical components with similar characteristics. Furthermore, although elements of the invention may be described or claimed in the singular, the plural is contemplated unless limitation to the singular is explicitly stated.

What is claimed is:

1. A device for adjusting a driving voltage provided to a plurality of light emitting diodes (LEDs), comprising:
   a switchable current sink coupled to cathodes of the plurality of LEDs for providing a regulated current to the plurality of LEDs, the switchable current sink being capable of providing a first reference voltage and outputting a plurality of voltage drops;
   a DC-DC converter coupled to anodes of the plurality of LEDs for providing the driving voltage to the plurality of LEDs;
   a reference circuit coupled to the switchable current sink, the reference circuit being capable of receiving the first reference voltage and the plurality of voltage drops from the switchable current sink, the reference circuit further being capable of selecting a minimum voltage drop from the plurality of voltage drops and comparing the first reference voltage with the minimum voltage drop to generate a second reference voltage for the DC-DC converter,
   wherein the DC-DC converter adjusting the driving voltage according to the second reference voltage to achieve the minimum voltage drop equal to the first reference voltage, the DC-DC converter further comprising:
   a converting unit having a voltage input terminal, a voltage output terminal, and a plurality of control terminals, the voltage input terminal receiving a DC input voltage, the voltage output terminal outputting the driving voltage, and
   a controller coupled to the converting unit, the controller being capable of providing a plurality of control signals to the plurality of control terminals, the plurality of control signals having a switching sequence and a switching cycle based upon the second reference voltage;
   a feedback circuit receiving the driving voltage from the converting unit, the feedback circuit being capable of scaling the driving voltage down to a scaled-down voltage; and
   a comparison circuit receiving the scaled-down voltage from the feedback circuit and further receiving the second reference voltage, the comparison circuit being capable of comparing the scaled-down voltage with the second reference voltage to get a comparison result, the comparison circuit further being capable of outputting the comparison result to the controller to start a new switching cycle.

2. The device of claim 1, wherein the switchable current sink further comprising:
   a current control circuit capable of outputting a reference signal for controlling the regulated current;
   a selector signal generator for generating a plurality of selector signals; and
   a connection circuit having a reference input terminal, a reference output terminal, a plurality of current terminals, and a plurality of selector terminals, the reference input terminal receiving the reference signal from the current control circuit, each current terminal being coupled to one of the plurality of LEDs, each selector terminal being coupled to one of the plurality of selector signals,
wherein the connection circuit providing the regulated current to each of the plurality of LEDs according to the plurality of selector signals, the regulated current being regulated through the reference signal.

3. The device of claim 2, wherein the current control circuit further comprising:
a set of current sources capable of outputting a plurality of currents, each current with a current level;
a current selector having a plurality of position terminals and at least one current control terminal, each position terminal being coupled to a current from the plurality of currents, the current selector being capable of providing a current coupled to a selected position terminal; and
a resistor coupled to the current selector, the resistor being capable of receiving the current coupled to the selected position terminal and generating the reference signal.

4. The device of claim 3, wherein the current control circuit receiving at least one current control signal at the at least one current control terminal, the at least one current control signal enabling the current selector to provide the current coupled to the selected position terminal, the current flowing through the reference resistor and causing a voltage across the reference resistor, and the voltage being the reference signal.

5. The device of claim 2, wherein the connection circuit further comprising:
a plurality of current sinking paths, each current sinking path having one of the plurality of current terminals, a first path terminal, a second path terminal and a ground terminal, the ground terminal being coupled to the ground;
an operational amplifier having a non-inverting terminal, an inverting terminal and an output terminal, the non-inverting terminal serving as the reference input terminal; and
a plurality of switch sets, each switch set being coupled between the operational amplifier and one of the plurality of current sinking paths, the inverting terminal and the output terminal being respectively coupled to the first path terminal and the second path terminal through the switch set, the plurality of switch sets having the plurality of selector terminals.

6. The device of claim 5, wherein the plurality of selector signals enabling only one of the plurality of switch sets at any one time.

7. The device of claim 5, wherein each current sinking path further comprising:
a resistor having the ground terminal and the first path terminal; and
a transistor having a gate terminal, a source terminal and a drain terminal, the source terminal being coupled to the first path terminal, the gate terminal serving as the second path terminal, the drain terminal serving as the current terminal.

8. The device of claim 2, wherein the connection circuit adding an offset voltage to the reference signal to generate the second reference voltage at the reference output terminal.

9. The device of claim 1, wherein the converting unit adjusting the driving voltage according to the switching sequence and switching cycle of the plurality of control signals.

10. The device of claim 1, wherein the controller further comprising:
a control unit capable of providing the plurality of control signals;
an activation generator coupled to the control unit, the activation generator being capable of providing a first predetermined time interval to the control unit;
a disactivation generator coupled to the control unit, the disactivation generator being capable of providing a second predetermined time interval to the control unit; and
a converter mode detector coupled to the control unit, the converter mode detector being capable of controlling the switching sequence.

11. The device of claim 10, wherein the first predetermined time interval and the second predetermined time interval controlling the switching cycle.

12. The device of claim 10, wherein the activation generator receiving the DC input voltage, and the second reference voltage, the DC input voltage and the reference voltage determining the first predetermined time interval.

13. The device of claim 10, wherein the disactivation generator receiving the DC input voltage and the second reference voltage, the DC input voltage and the reference voltage determining the second predetermined time interval.

14. The device of claim 1, wherein the switchable current sink selecting only one of the plurality of LEDs and regulating the current of the selected one LED at one time.

15. A method of adjusting a driving voltage provided to a plurality of light emitting diodes (LEDs), comprising:
generating at a DC-DC converter the driving voltage;
providing by a current sink a plurality of regulated currents to the plurality of LEDs and a first reference voltage;
selecting a minimum voltage drop from a plurality of voltage drops across the current sink;
comparing at an error amplifier the first reference voltage with the minimum voltage drop across the current sink;
generating at the error amplifier a second reference voltage according to a comparison result from comparing the first reference voltage with the minimum voltage drop;
generating a plurality of control signals having a switching sequence and a switching cycle based upon the second reference voltage;
achieving the minimum voltage drop equal to the first reference voltage by adjusting at the DC-DC converter the driving voltage according to the switching sequence and switching cycle of the plurality of control signals;
scaling down at a feed back circuit the driving voltage to a scaled-down voltage;
comparing at a comparison circuit the scaled-down voltage with the second reference voltage to obtain a comparison result; and
starting a new switch cycle based upon the comparison result.

16. The method of claim 15, wherein the step of adjusting at the DC-DC converter the driving voltage further comprising the steps of:
generating a first predetermined time interval according to the second reference voltage and a DC input voltage;
generating a second predetermined time interval according to the second reference voltage and the DC input voltage; and
generating the plurality of control signals with the switching cycle consisting of the first predetermined time interval and the second predetermined time interval.

17. The method of claim 15, further comprising:
selecting only one of the plurality of LEDs at one time by the current sink; and
regulating the current of the selected one LED by the current sink.

* * * * *